Figure 1:
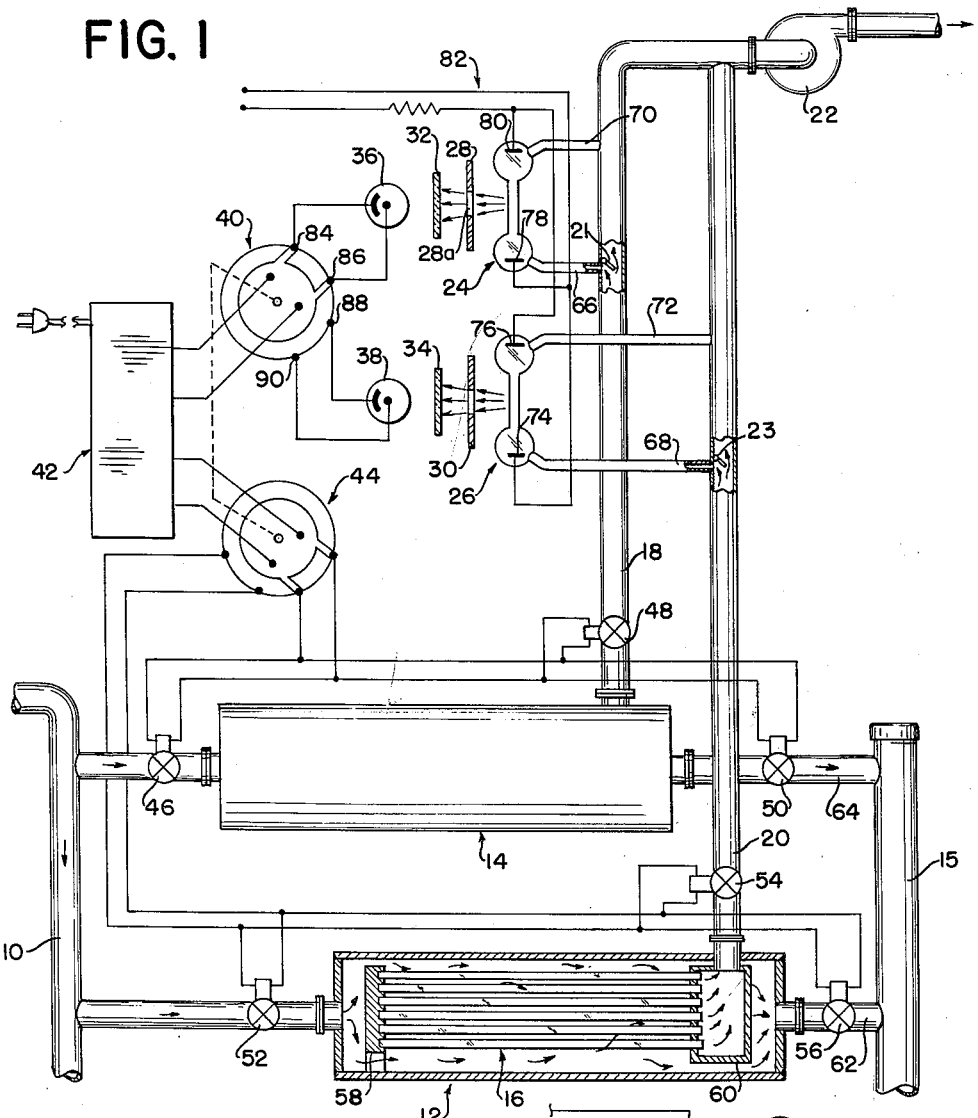

Feb. 27, 1962 E. D. TILLYER ET AL 3,022,858
APPARATUS AND METHODS FOR PRODUCTION OF
HELIUM BY DIFFUSION
Filed Sept. 25, 1959

INVENTORS
EDGAR D. TILLYER
WILLARD E. FOLLAND
BY
*Blair Spencer and Buckles*
ATTORNEYS United States Patent Office 3,022,858
Patented Feb. 27, 1962

3,022,858
APPARATUS AND METHODS FOR PRODUCTION OF HELIUM BY DIFFUSION
Edgar D. Tillyer, Southbridge, and Willard E. Folland, Sturbridge, Mass., assignors to American Optical Company, Southbridge, Mass., an association of Massachusetts
Filed Sept. 25, 1959, Ser. No. 842,502
16 Claims. (Cl. 183—2)

This invention relates to apparatus and methods for separating and monitoring the purity of gases. More particularly, it relates to apparatus for separating helium of high commercial purity from natural gas or volatile oil refinery gases, monitoring the separated helium, and automatically stopping the separating apparatus whenever impurities appear in the separated product.

In the past, the only available techniques for producing helium have involved elaborate and expensive low-temperature distillation processes for treating natural gas containing significant concentrations of helium. New helium recovery techniques have now been developed based upon the principle that helium diffuses through a thin glass barrier while the other constituents of natural gas generally do not diffuse through such a barrier. High pressure differentials, high temperatures, and large effective surface areas for the diffusion barrier are required to produce commercial quantities of helium in this manner, and banks of fine glass capillary tubes have been used to form the desired barrier through which helium is separated by diffusion.

While helium of high purity can be produced by such diffusion techniques, the monitoring and maintenance of this high purity against any contamination with other gases is of great importance. In addition to its familiar use for filling the gas bags of lighter-than-air ships, helium has important medical uses in the clinical treatment of respiratory diseases, e.g. asthma, croup, and the like. In these treatments, helium is mixed with oxygen to form an artificial atmosphere supplied to the patient, with the helium replacing all or part of the nitrogen in ordinary air. Similar artificial helium-oxygen atmospheres are supplied to deep sea divers and workers in underwater tunnels, caissons, and the like, to avoid the dangerous hazard known as "the bends." The low solubility of helium in the human blood stream reduces the decompression dangers involved when underwater workers return to ordinary atmospheric pressure at the earth's surface. Helium is also used in electronic tubes, in scientific instruments, and as a low temperature refrigerant. In all of these uses, and particularly in the artificial helium atmospheres to be breathed by man, the purity of the helium is extremely important.

Helium of commercial and pharmaceutical purity can be extracted and separated from natural gas containing far lower helium concentrations than were heretofore commercially significant by means of the helium diffusion techniques now being developed. The discovery that helium will pass by diffusion through thin glass barriers has permitted the development of helium diffusion cells incorporating banks of thin-walled glass capillary tubes leading to a collecting chamber. Natural gas passing outside these banks of tubes under high pressure surrounds the tubes, and helium from this natural gas diffuses into the tubes to be drawn away to a storage tank. The term "glass" for the material from which these capillary tubes are formed will mean either ordinary glass or preferably a special glass high in silica, or fused quartz.

If desired, the natural gas itself may be forced into the interiors of these capillary tubes, allowing helium to diffuse through the tube walls to the surround where it can be collected. Since the natural gas often contains droplets and particles of material which may clog the fine tubes, however, it is often more practical to pass the natural gas outside the capillary tubes and extract the helium diffusing into the interiors of the tubes. Pressure differential ratios on opposite sides of the glass barrier as high as 1000 to 1 and temperatures up to 400° C. have been employed, and a vacuum pump is generally used to draw the helium from within the capillary tubes and to deliver it to a helium storage tank.

Helium diffuses far more readily than any other material through these thin glass barriers, and diffusion of impurities along with the helium is generally not an important problem in a properly-functioning diffusion cell. Faults or breakage of the capillary tubes, however, may suddenly and drastically reduce the purity of helium produced in such diffusion cells. The defective cell must be promptly identified and disconnected from the helium collecting system in order to preserve the purity of the helium being produced. For this reason, automatic purity-monitoring systems with quick response times, capable of cooperation with automatic control devices, are essential to the maintenance of these high purity requirements.

Accordingly, it is a principal object of the present invention to provide gas purity monitoring apparatus and methods affording prompt and effective indications of variations in the purity of a flowing stream of gas.

Another object of the invention is to provide extracting systems incorporating apparatus and methods of the above character for extracting helium of high purity from mixtures of other gases. A further object of the invention is to provide apparatus and methods of the above character suitable for use with helium-diffusion extraction cells.

An additional object of the invention is to provide methods and apparatus for use with the extracting and monitoring apparatus to disconnect any defective extracting units from the helium stream to preclude any appreciable impurities in the collected separated gas.

Still another object of the present invention is to provide apparatus and methods of the above character useful in bulk helium extraction plants employing batteries of helium diffusion extraction units.

Other objects of the invention will in part be obvious and will in part appear hereinafter.

The invention accordingly comprises the several steps and the relation of one or more of such steps with respect to each of the others, and the apparatus embodying features of construction, combinations of elements, and arrangement of parts which are adapted to effect such steps, all as exemplified in the following detailed disclosure, and the scope of the invention will be indicated in the claims.

Figure 2:
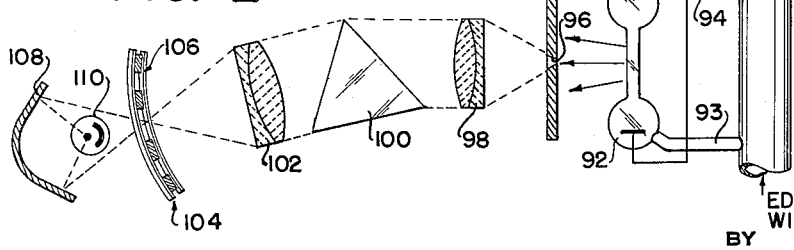

For a fuller understanding of the nature and objects of the invention, reference should be had to the following detailed description taken in connection with the accompanying drawings, in which:

FIGURE 1 is a schematic diagram of a helium extraction system and apparatus incorporating one embodiment of the present invention, partially in section; and FIGURE 2 is a fragmentary schematic diagram of the purity-monitoring portion of the system in a different embodiment of the invention.

Similar reference characters refer to similar parts throughout the several views of the drawing.

Helium diffusion extraction apparatus incorporating one embodiment of the present invention is shown in FIGURE 1. Two capillary tube diffusion cells 12 and 14 are shown in the lower portion of FIGURE 1, and batteries of such cells are generally used in this apparatus in order to maintain the purity of helium produced. Thus there is a need for continuous monitoring and automatic purity control systems selectively responsive to the presence of impurities in the helium produced by each cell.

In the apparatus shown in FIGURE 1, the diffusion cells generally indicated at 12 and 14 are both supplied with raw natural gas, for example, via gas delivery main 10. The gas in the cells is under high pressure, and the helium therein passes through the thin-walled glass tubes generally indicated at 16 and thence via collecting chamber 60 into exit lines 18 and 20. Helium exit lines or conduits 18 and 20 conduct helium separated in the diffusion cells to a pump 22 which delivers the helium to a storage tank. Glow discharge tubes generally indicated at 24 and 26 are connected to helium exit conduits 18 and 20, respectively, each glow tube being filled with flowing gas diverted from its connected exit conduit. Each of these glow tubes 24 and 26 produces radiation having emission spectra corresponding to the constituent gases in the respective exit conduits.

A purity monitoring system selectively responsive to the radiation emission spectra of impurities in the exit conduits is connected to control the flow of gas to each diffusion cell, as well as the flow of gas in each exit conduit. This system permits the automatic shutting down of any single diffusion cell if the purity of helium emitted therefrom is below acceptable standards. More particularly, this purity-monitoring system includes iris diaphragms 28 and 30 and selective filters 32 and 34, each designed to block the major emission spectral lines of helium and to pass substantially all other emitted radiation. Thus, radiation produced by impurities in the glow discharge tubes will reach photocells 36 and 38 to produce an output signal which is picked up by a selector switch generally indicated at 40 and transmitted to an amplifier relay generally indicated at 42. Thus this output signal is amplified and sent to an amplifier switch generally indicated at 44 which is ganged to rotate in synchronism with selector switch 40. It will be apparent from a consideration of the circuit in FIGURE 1 that the actuation of motorized valves 46, 48, 50, 52, 54, and 56, which control the flow of all gas to and from cells 12 and 14, is under the control of switches 40 and 44 and is responsive to signals produced by radiation from glow tubes 24 and 26.

Turning now to a description of the specific apparatus which may be used with facility in this system, it will be seen that the cells 12 and 14 include a support 58 for the bank of fine glass capillary tubes 16 having closed ends mounted therein adjacent the entrance of the cell. Tubes 16 having their opposite open ends extending in a collecting chamber 60, and such chambers in each cell are connected to exit conduits 18 and 20. As noted above, the tubes 16 have the characteristic of permitting helium to diffuse through their walls. Accordingly, natural gas or refinery gases under pressure may enter the cell, and as indicated by the arrows in FIGURE 1, the helium in the gas flowing through the cell passes into and through the tubes and into the exit conduits 18 and 20, while the remaining gas passes around the tubes to escape through lines 62 and 64 to the main gas exit line 15.

The separated helium thus passes up exit lines 18 and 20 under the impetus of pump 22 leading to a suitable storage tank as hereinbefore mentioned. A portion of the gas in tubes 18 and 20 is deflected by deflecting flanges 21 and 23, to pass via tubes 66 and 68, respectively, to glow discharge tubes 24 and 26. Gas from the tubes 24 and 26 is returned to the exit conduits 18 and 20 by tubes 70 and 72. Accordingly, it will be seen that in normal operation helium from the cells 12 and 14 is continuously flowing through glow discharge tubes 24 and 26 where it is monitored for impurities in a manner now to be described.

These glow tubes 24 and 26 are of standard construction and include electrodes 74, 76, 78, and 80 connected in an electrical system diagrammatically indicated at 82. Thus a voltage is imposed across the electrodes of each tube and causes a radiation emission from the tubes containing emission spectral lines corresponding to all constituent gases in the exit conduits 18 and 20. If the helium diffusion cell connected to each of these tubes is operating properly, helium of very high purity passes through the glow discharge tubes 24 and 26.

Inasmuch as the glow discharge tubes 24 and 26 are here shown as identical in construction, the specific construction and operation of the tube 24 and apparatus associated therewith will be sufficient. The selective filter 32 is designed to block the major lines of the helium emission spectrum, while permitting passage of radiation having wavelengths in the remainder of the spectrum. For example, this filter comprises a glass having the desired filtering characteristics, or it can be made from selected gelatin material. A portion of the radiation emitted by glow discharge tube 24 passes through the aperture 28a in the iris diaphragm 28 to selective filter 32 where the major lines of the helium emission spectrum are blocked. However, if impurities appear in the helium in exit conduit 18, radiation produced thereby in the glow discharge tube 24 will pass through selective filter 32 to strike photocell 36, producing an impurity output signal from this photocell. In this manner photocells 36 and 38 are continuously monitoring the purity of the helium flowing through exit lines 18 and 20.

These photocells 36 and 38 are connected to selector switch 40, i.e. contacts 84 and 86 of the switch are connected to cell 36, and contacts 88 and 90 thereof are connected to cell 38. As previously mentioned, selector switch 40 is of the rotary type so that in operation it periodically and successively connects amplifier-relay 42 to contacts 84 and 86 or to contacts 88 and 90. Switch 40 is connected to amplifier 42 and hence, whenever impurities appear in either of exit conduits 18 and 20, the resulting impurity signal is promptly transmitted thereto. It will be obvious that signal lights could be introduced into the system at this point to give a visual indication of impurities in a particular helium exit conduit. It will also be obvious that the same system could be multiplied to monitor any number of gas lines desired. As the system is shown in FIGURE 1, if an impurity output signal comes, for example, from the monitoring system associated with exit conduit 18, this signal is amplified in the amplifier-relay unit 42, and a control signal is thereby applied to selector switch 44, ganged for movement in synchronism with switch 40. Thus, an energized circuit from selector switch 44 to motor valves 46, 48, and 50 will be immediately established. This circuit and associated equipment is designed to close valves 46, 48, and 50 upon reception of such signal, thereby stopping the flow of gas to the cell 14 and from the cell to the exit conduit 18 and to line 64. It will be apparent also that if an impurity signal is received from glow tube 26, this will trigger the closing of valves 52, 54, and 56, blocking the conduits leading to and from cell 12 in a similar manner. Conventional electrical equipment (not shown) is provided for reopening the controlling valves to and from each of the cells, so that upon repairing a defective cell, it may re-enter the system. The valves are constructed to close upon receipt of a signal from the monitoring system described and also to remain open upon being re-set until the receipt of another impurity signal.

It will thus be seen that the arrangement illustrated in FIGURE 1 provides prompt identification of the presence of contaminating impurities in the helium output of each individual diffusion cell and responds to the presence of such impurities by actuating the necessary valves to remove the defective cell from the helium extraction system. After the cell has been examined and the source of the impurities identified and repaired, it may be reconnected into the system to operate as before.

In the purity-monitoring arrangement shown in FIGURE 2, a glow discharge tube 92, generally similar to the tubes 24 and 26 of FIGURE 1, is connected in parallel with a helium exit conduit such as conduit 18 to receive gas therefrom via connecting tubes 93 and 94. Radiation from tube 92 passes through a slit in diaphragm 96, through a collimating lens 98 to a spectrum-forming element such as a grating, a prism-grating combination, or one or more prisms, such as the prism 100 shown in FIGURE 2. Thence the radiation in the form of a spectrum passes through an objective lens system 102 to image the spectrum so formed on a barrier member generally indicated at 104. This barrier 104 includes a suitable screening arrangement generally indicated at 106 arranged to block the major lines of the helium emission spectrum, e.g. the 5876 A. and the 3889 A. helium lines, while passing radiation of intermediate and adjacent wavelengths. Radiation caused by impurities in glow discharge tube 92 will be focused by the objective lens system 102 at unscreened points on barrier 104 and will thus pass therethrough to a photocell 110. This radiation may pass directly to the photocell, or it may be imaged thereon by a collecting lens system or a spherical or parabolic reflector, such as the reflector 108 shown in FIGURE 2. The output from photocell 110 is periodically connected to an amplifier relay system, for example in the manner shown in FIGURE 1, so that any "impurity output signal" triggers the closing of cutoff motorized valves, thereby removing a defective helium diffusion cell from an extraction system.

The preferred methods of the present invention thus include the steps of separating helium from other gases by diffusion through a suitable diffusion barrier, preferably a bank of thin-walled glass capillary tubes installed in a diffusion cell, inducing an electrical glow discharge in the separated helium, blocking the emitted radiation from this glow discharge having the wavelengths of the principal spectral lines of the emission spectrum of helium, receiving radiation of the other wavelengths from this glow discharge caused by undesired impurities in the separated helium, converting such received radiation to an electrical signal, preferably in a photocell, amplifying this electrical signal, and employing this signal to stop the flow of gas and isolate the defective diffusion cell whenever such impurities appear in the separated helium.

The helium extraction methods and apparatus of the present invention are thus adapted to produce helium of high purity from natural gas having low concentrations of helium, and to maintain the purity of helium being produced within extremely close tolerances, made possible by the automatic removal from the extraction system of any individual helium diffusion cell producing helium of less than the desired purity. The helium produced by these systems is thus pharmaceutically pure and suitable for breathing by human beings in artificial atmospheres, or for use in scientific apparatus or other applications where commercially pure helium is required. The systems of the present invention may employ large batteries of diffusion cells arranged in parallel, as illustrated by the parallel cells 12 and 14 in FIGURE 1, each cell having a helium exit conduit and an associated purity-monitoring system similar to those shown.

It will thus be seen that the objects set forth above, among those made apparent from the preceding description, are efficiently attained and, since certain changes may be made in carrying out the above method and in the constructions set forth without departing from the scope of the invention, it is intended that all matter contained in the above description or shown in the accompanying drawings shall be interpreted as illustrative and not in a limiting sense.

It is also to be understood that the following claims are intended to cover all of the generic and specific features of the invention herein described, and all statements of the scope of the invention which, as a matter of language, might be said to fall therebetween.

We claim:

1. In extraction apparatus for separating commercially pure helium from mixtures of other gases, the combination of a helium diffusion cell including a plurality of glass capillary tubes interposed in a flowing stream of said gaseous mixture and a collecting chamber associated with said tubes and adapted to receive helium gas passing by diffusion through the walls of said tubes, a pump, a helium exit conduit joining said collecting chamber to said pump, and a purity monitoring system associated with said exit conduit and including a glow discharge tube connected to be filled by flowing gases diverted from said exit conduit, signaling means selectively responsive to the principal wave lengths in the emission radiation spectra of undesired impurities instantaneously present in said glow discharge tube and selectively non-responsive to the principal emission radiation wave lengths of helium, said signaling means being capable of producing a signal indicating the presence of such impurities, and valve means responsive to said signal for controlling the flow of gas from said diffusion cell.

2. In extraction apparatus for separating commercially pure helium from mixtures of other gases, the combination of a helium diffusion cell including a plurality of glass capillary tubes interposed in a flowing stream of said gaseous mixture and a collecting chamber associated with said tubes and adapted to receive helium gas passing by diffusion through the walls of said tubes, a pump, a helium exit conduit joining said collecting chamber to said pump, and a purity monitoring system associated with said exit conduit and including a glow discharge tube connected to said exit conduit to be filled by continuously flowing gases diverted from said exit conduit and thereby adapted to produce radiant energy having the emission spectra of the constituent gases instantaneously present in said exit conduit, filter means interposed in the path of said radiant energy and selected to block radiation of the major spectral wavelengths of helium while passing radiation of other wave lengths indicating the presence of impurities other than helium in said exit conduit; radiation-sensitive means for receiving radiant energy passed by said filter means and adapted to produce an output signal in response to said radiation passed by said filter means, and valve means controlled by said output signal for blocking the flow of gas through said helium exit conduit upon receipt of a proper signal from said radiation-sensitive means.

3. The combination defined in claim 2 in which said filter means includes a spectrum-forming element and a barrier element having a screen positioned to block said radiant energy of each major spectral wavelength of helium in the spectrum formed by said spectrum-forming element.

4. The combination defined in claim 2 which includes a prism element positioned in the path of radiant energy emitted by said glow discharge tube and adapted to form a spectrum from said radiant energy, and a barrier element having a screen positioned to block each major helium line of said spectrum.

5. The combination defined in claim 2 in which said filter means includes a diaphragm with a central slit positioned in the path of radiant energy from said glow discharge tube, a collimator lens positioned to receive and collimate radiant energy passing through said slit, a prism disposed to refract said collimated radiant energy, an objective lens positioned to focus said refracted radiant energy to form a spectrum therefrom, a barrier positioned at said focused spectrum and including a screen disposed to block each major helium line in said spectrum while passing radiation of other wavelengths, said radiation-sensitive means being positioned adjacent said barrier to receive radiant energy passing said screen.

6. The combination defined in claim 2 in which said filter means includes a selective filter having a transmission spectrum preselected to block said radiant energy of each major spectral wavelength of helium.

7. The combination defined in claim 2 in which said radiation-sensitive means is a photocell positioned to receive radiation passed by said filter means.

8. In extraction apparatus for separating commercially pure helium from a mixture of other gases, the combination of a helium diffusion cell including a plurality of glass capillary tubes interposed in a flowing stream of said gaseous mixture and a collecting chamber associated with said tubes and adapted to receive helium gas passing by diffusion through the walls of said tubes, a pump, a helium exit conduit joining said collecting chamber to said pump, and a purity-monitoring system associated with said exit conduit and including a glow discharge tube connected to said exit conduit to be continuously filled by flowing gases diverted from said exit conduit and adapted to produce radiant energy having the emission spectra of the constituent gases instantaneously present in said exit conduit, a selective filter interposed in the path of said radiant energy and having an absorption spectrum selected to block radiation of the major spectral wavelengths of helium while passing radiation of other wavelengths, a photocell interposed in said radiation passed by said selective filter producing an output signal in response to said passed radiation, and means including an automatic motorized valve connected to be actuated by said output signal for blocking the flow of gas through said helium exit conduit.

9. In extraction apparatus for separating commercially pure helium from mixtures of other gases, the combination of a plurality of helium diffusion cells, each including a bank of glass capillary tubes interposed in a flowing stream of said gaseous mixture, and a collecting chamber associated with each bank of said tubes and adapted to receive helium gas passing by diffusion through the walls of said tubes, a pump, a corresponding plurality of helium exit conduits, each joining one of said collecting chambers to said pump, and a purity-monitoring system associated with each said exit conduit and including a corresponding plurality of glow discharge tubes, each filled by flowing gases diverted from one said exit conduit, and means selectively responsive to the radiation spectra of undesired impurities instantaneously present in each said glow discharge tube, said responsive means being capable of producing a signal indicating the presence of such impurities in said exit conduits.

10. In extraction apparatus for separating commercially pure helium from mixtures of other gases, the combination of a plurality of helium diffusion cells, each including a bank of glass capillary tubes disposed in a flowing stream of said gaseous mixture, and a collecting chamber associated with each bank of said tubes and adapted to receive helium gas passing by diffusion through the walls of said tubes, a pump, a corresponding plurality of helium exit conduits, each joining one said collecting chamber to said pump; a purity-monitoring system associated with said exit conduits and including a corresponding plurality of glow discharge tubes, each filled by flowing gases diverted from one said exit conduit and thereby adapted to produce radiant energy having the emission spectra of the constituent gases instantaneously present in said exit conduit, filter means interposed in the path of said radiant energy from each said glow discharge tube and having an absorption spectrum selected to block the radiation of the major spectral wavelengths of helium while passing radiation of other wavelengths, radiation-responsive means for receiving radiant energy passed by each of said filter means adapted to produce an output signal in response to said passed radiation, and a corresponding plurality of motorized valves, each positioned in one of said exit conduits, said valves being connected to be actuated by said output signal to block the flow of gas in the exit conduit associated with each glow discharge tube producing said passed radiation.

11. The combination defined in claim 10 in which said radiation-responsive means includes a corresponding plurality of photocells, each positioned to receive radiation emitted by one of said glow discharge tubes, and passing through its associated filter means, said combination also including an amplifier means, a first selector switch connected to conduct the output signal from each of said photocells to said amplifier means successively and periodically, and a second selector switch ganged to operate in synchronism with said first selector switch and connected to conduct amplified output signals from said amplifier means successively and periodically to said valve interposed in the helium exit conduit associated with the glow discharge tube producing said passed radiation.

12. A method for extracting commercially pure helium from a mixture of gases and for monitoring the purity of said helium comprising the steps of separating helium from said mixture, producing an electrical glow discharge in said separated helium, blocking emitted radiation from said glow discharge having the wavelengths of the principal spectral lines of the helium emission spectrum, receiving radiation of other wavelengths from said glow discharge, converting said received radiation into an electrical signal indicating the presence of substances other than helium in said glow discharge, and regulating the purity of the helium being produced by blocking the flow of helium whenever the presence of substances other than helium is indicated by this electrical signal.

13. The method defined in claim 12 including the further steps of amplifying said electrical signal and blocking the flow of helium in response to said amplified signal.

14. A method for separating helium from a flowing mixture of helium and other gases and monitoring the purity of the helium so produced comprising the steps of dividing a flowing mass of said mixture of gases into a plurality of flowing streams, continuously separating helium from each said stream in a diffusion-separation step, drawing the helium separated from each said stream along an individual path, creating an electrical glow discharge in the helium in each said path, blocking radiation of the major emission spectral wavelengths of helium from each said discharge, measuring the intensity of any unblocked radiation of other wavelengths caused by impurities instantaneously present in the helium in said path, converting said intensity measurements into electrical signals indicating the presence of impurities in any of said path, and regulating the purity of helium being produced by blocking the flow of helium along any of said paths in which the presence of impurities is indicated by these electrical signals.

15. In helium diffusion apparatus for extracting helium from mixtures of other gases by molecular diffusion through glass, a purity-monitoring system interposed in a helium exit conduit and comprising, in combination, a glow discharge tube, by-pass conduits connecting said discharge tube in parallel with a segment of the helium exit conduit to fill said discharge tube with a changing sample of the gases instantaneously present in said exit conduit, means for producing a glow discharge within said discharge tube, signaling means selectively responsive to emission spectral wave lengths other than the major emission wave lengths of helium to produce a signal indicating the presence of undesired impurities, and valve means responsive to said signal and interposed to stop the flow of extracted helium through the exit conduit when said signaling means responds to radiation produced by said undesired impurities.

16. The combination defined in claim 10 including a second corresponding plurality of inlet valve means actuated by said output signal to block the flow of gas mixture through the cell yielding the impurity producing said passed radiation.

References Cited in the file of this patent

UNITED STATES PATENTS

| | | |
|---|---|---|
| 2,370,475 | Lemmers | Feb. 27, 1945 |
| 2,692,820 | Alway et al. | Oct. 24, 1954 |
| 2,892,508 | Kohman et al. | June 30, 1959 |
| 2,911,057 | Green et al. | Nov. 3, 1959 |

FOREIGN PATENTS

| | | |
|---|---|---|
| 556,426 | Canada | Apr. 22, 1958 |

UNITED STATES PATENT OFFICE
CERTIFICATE OF CORRECTION

Patent No. 3,022,858                February 27, 1962

Edgar D. Tillyer et al.

It is hereby certified that error appears in the above numbered patent requiring correction and that the said Letters Patent should read as corrected below.

Column 3, line 62, for "having" read -- have --; column 6, line 49, for "filler" read -- filter --.

Signed and sealed this 28th day of August 1962.

(SEAL)
Attest:

ESTON G. JOHNSON
Attesting Officer

DAVID L. LADD
Commissioner of Patents